(12) United States Patent
Nagahara

(10) Patent No.: US 6,542,311 B2
(45) Date of Patent: Apr. 1, 2003

(54) ZOOM LENS AND PROJECTION TYPE DISPLAY APPARATUS USING THE SAME

(75) Inventor: Akiko Nagahara, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 16 days.

(21) Appl. No.: 09/984,200

(22) Filed: Oct. 29, 2001

(65) Prior Publication Data
US 2002/0080499 A1 Jun. 27, 2002

(30) Foreign Application Priority Data
Nov. 8, 2000 (JP) .................. 2000-339955

(51) Int. Cl.⁷ .................. G02B 15/14; G02B 15/177
(52) U.S. Cl. .................. 359/676; 359/683; 359/686; 359/649
(58) Field of Search .................. 359/676, 694, 359/695, 686, 649, 679, 680–683

(56) References Cited

U.S. PATENT DOCUMENTS 6,008,952 A * 12/1999 Yamamoto .................. 359/683
6,137,638 A * 10/2000 Yamagishi et al. .......... 359/682
6,480,340 B1 * 11/2002 Yamamoto .................. 359/676

FOREIGN PATENT DOCUMENTS

JP 05-297276 11/1993
JP 10186235 A * 7/1998 .......... G02B/15/20
JP 10-268193 10/1998

* cited by examiner

Primary Examiner—Scott J. Sugarman
Assistant Examiner—Darryl J. Collins
(74) Attorney, Agent, or Firm—Snider & Associates; Ronald R. Snider

(57) ABSTRACT

A zoom lens comprises first to fifth lens groups successively from the enlargement side. The first lens group is fixed upon changing power and has a negative refracting power and a focusing function. The second and third lens groups having a positive refracting power and the fourth lens group having a negative refracting power are moved with a mutual relationship so as to continuously change power and correct the image surface movement caused by the continuous change in power. The fifth lens group has a positive refracting power and is fixed upon changing power. The first to fifth lens groups satisfy predetermined conditional expressions concerning their focal lengths.

5 Claims, 15 Drawing Sheets

EXAMPLE 1 (WIDE)

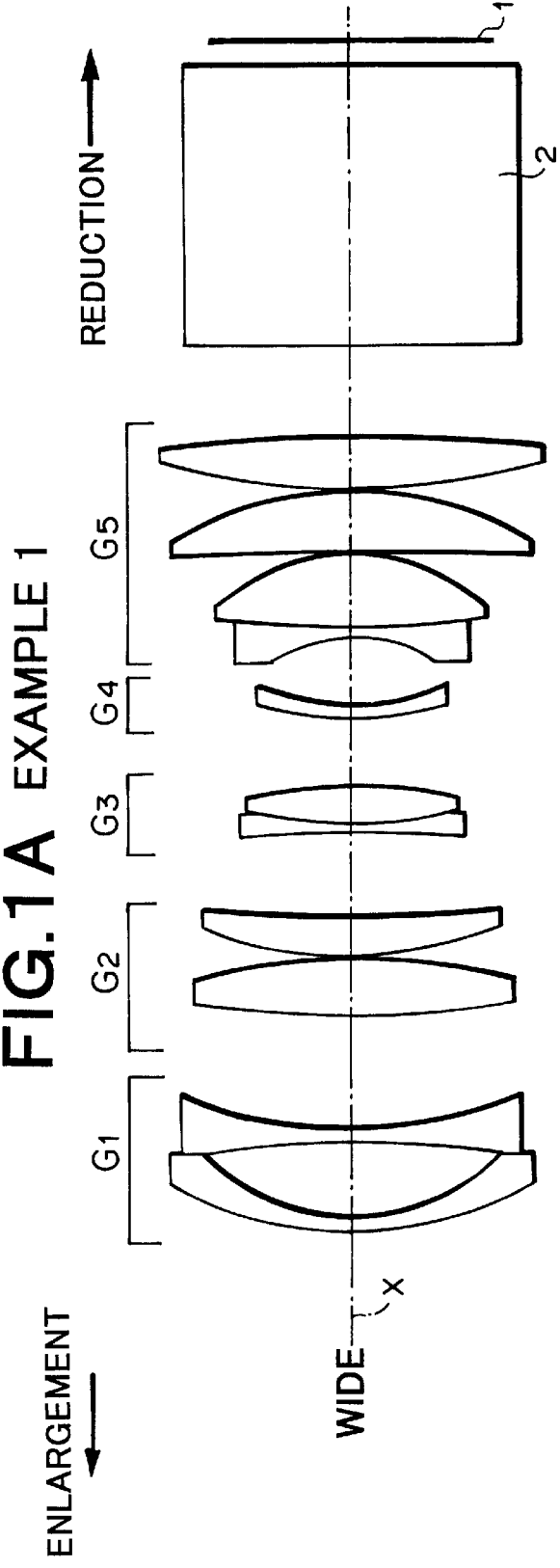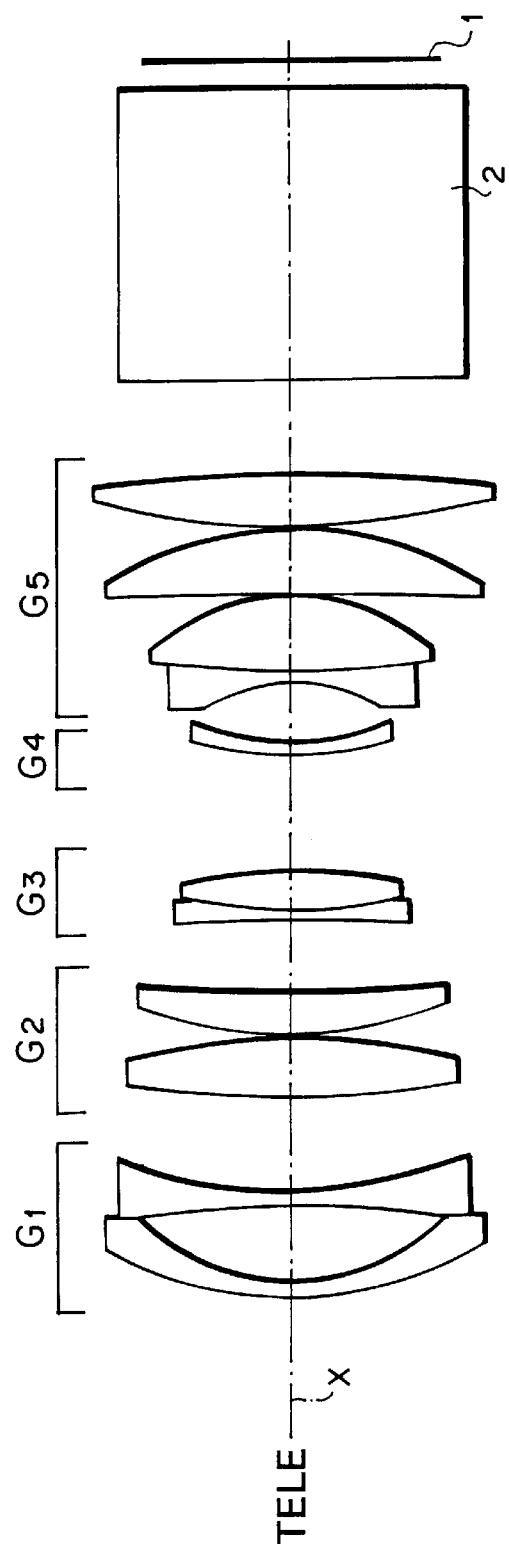

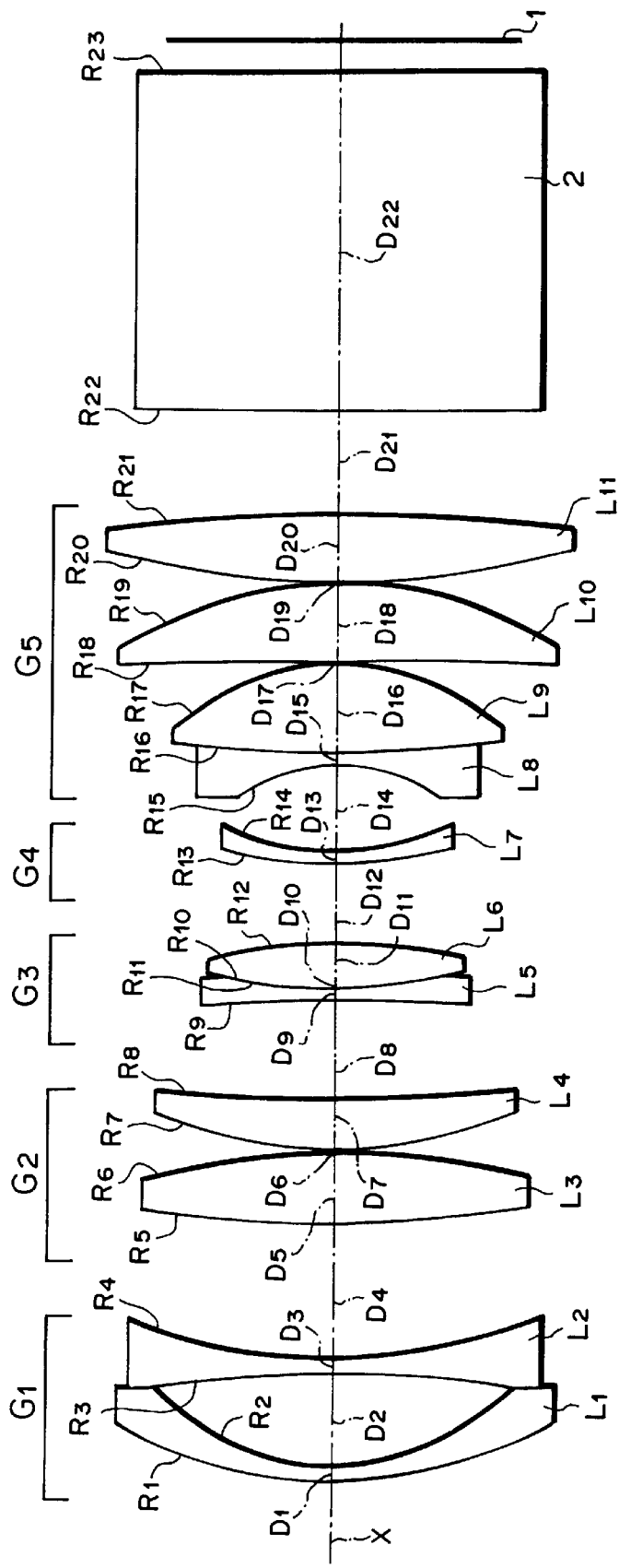
FIG.2 EXAMPLE 1 (WIDE)

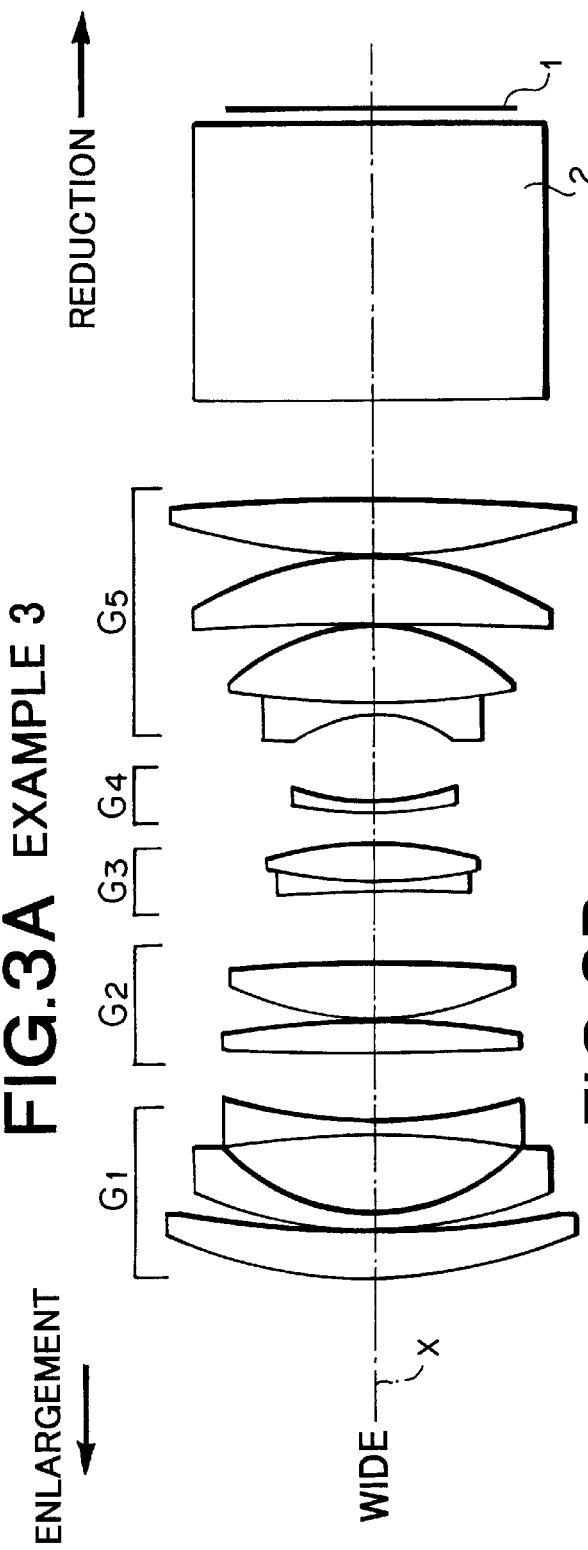
FIG.3A EXAMPLE 3
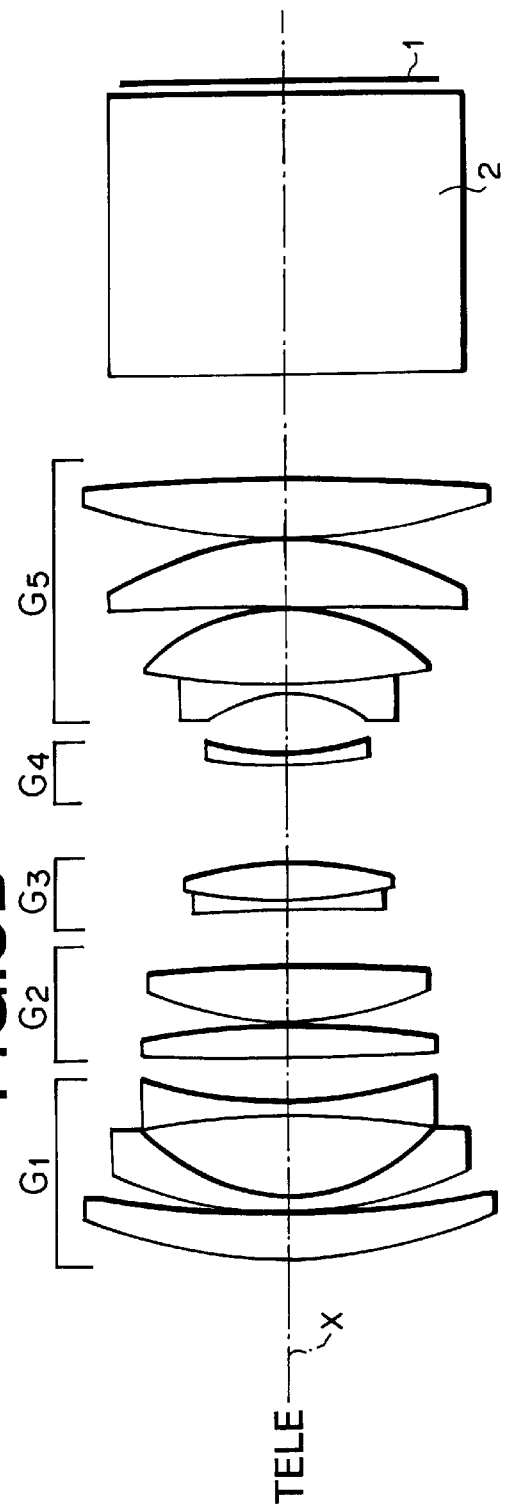
FIG.3B EXAMPLE 3

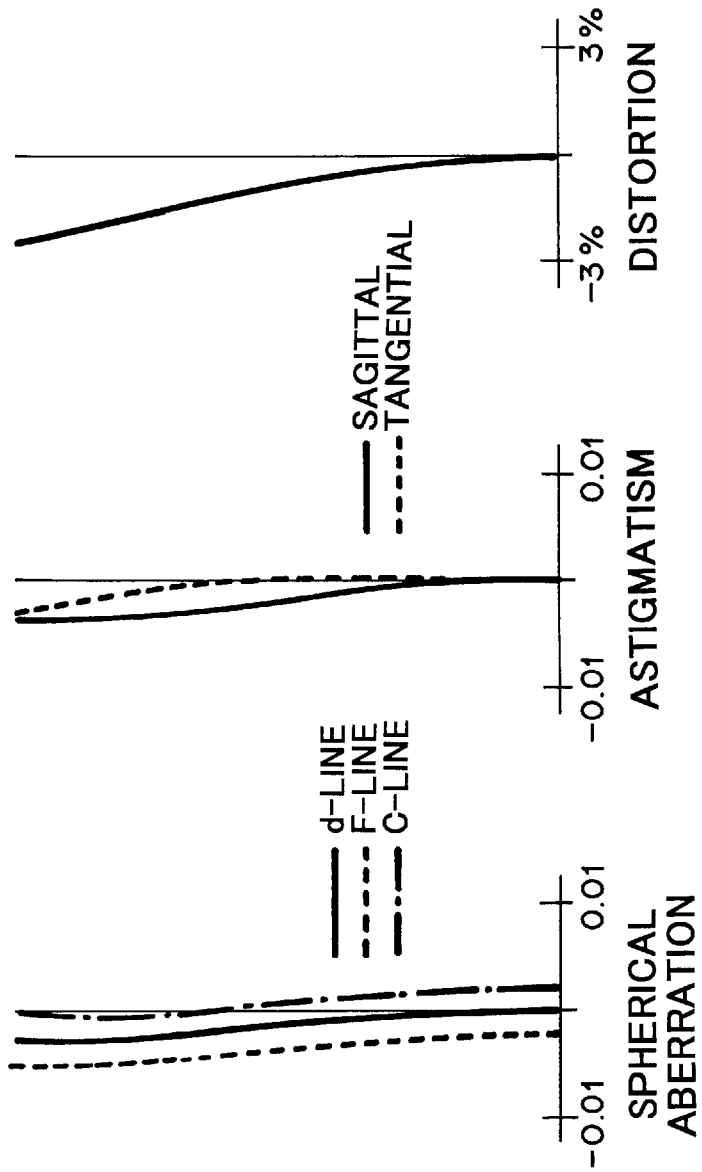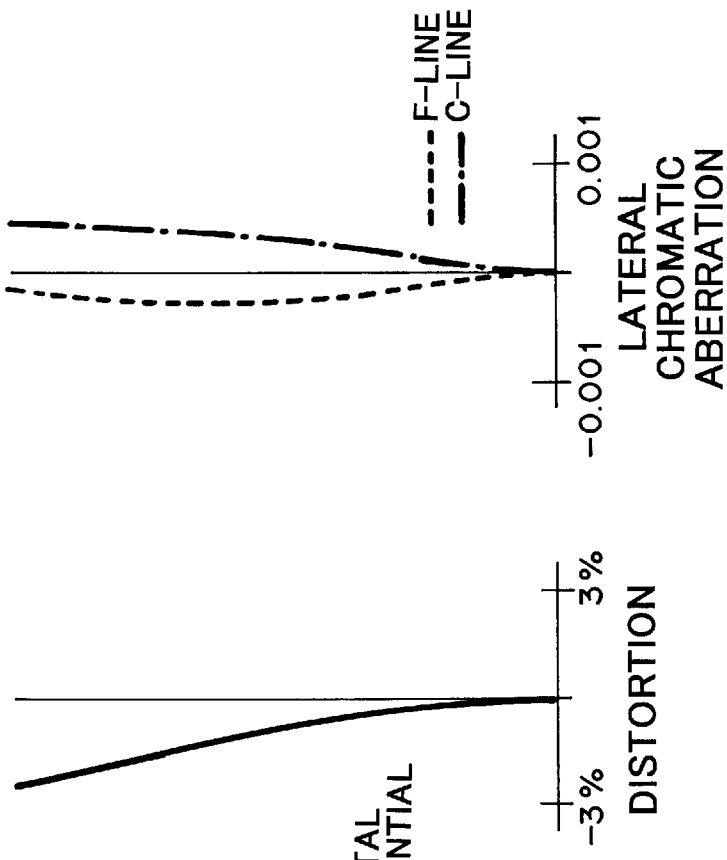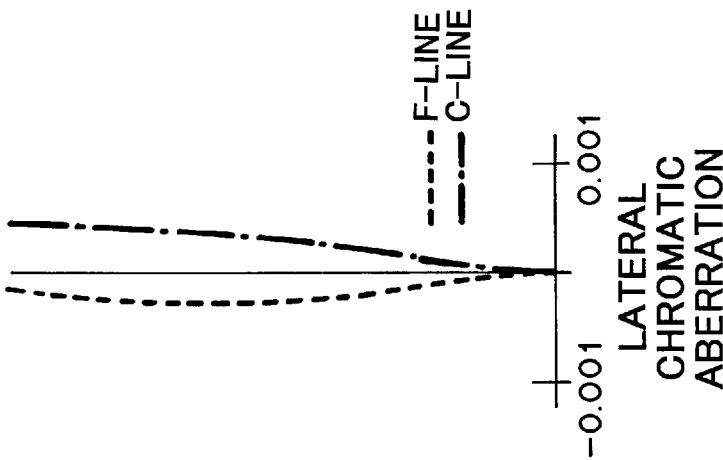

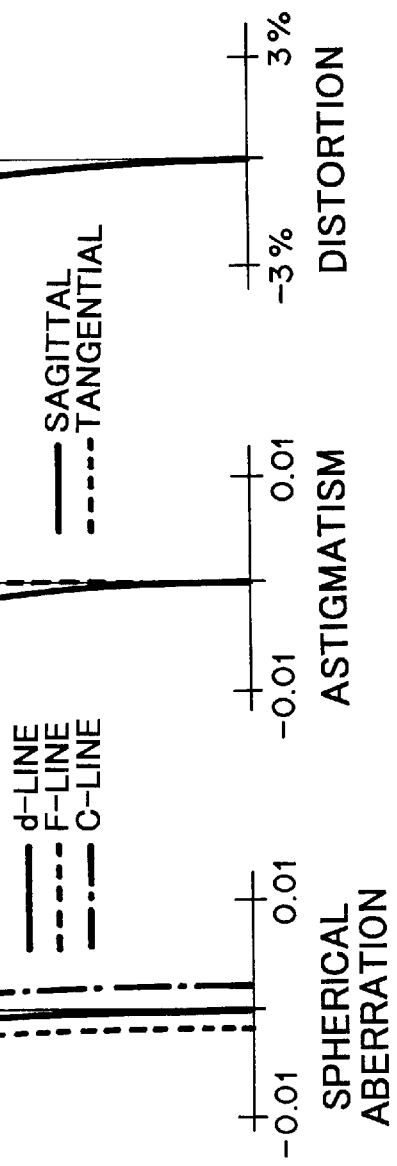

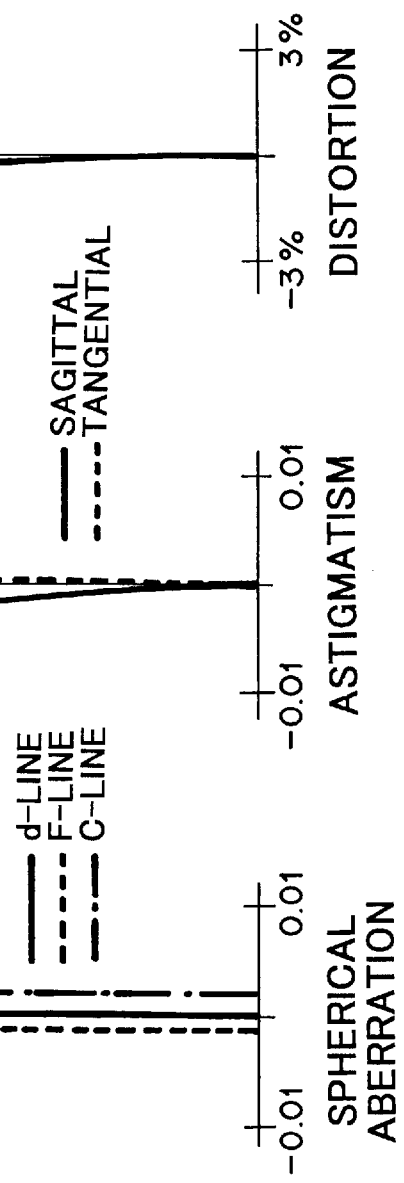
FIG.6A EXAMPLE 1 (TELE) F/2.20 — SPHERICAL ABERRATION (d-LINE, F-LINE, C-LINE)
FIG.6B EXAMPLE 1 (TELE) ω=26.5° — ASTIGMATISM (SAGITTAL, TANGENTIAL)
FIG.6C EXAMPLE 1 (TELE) ω=26.5° — DISTORTION
FIG.6D EXAMPLE 1 (TELE) ω=26.5° — LATERAL CHROMATIC ABERRATION (F-LINE, C-LINE)

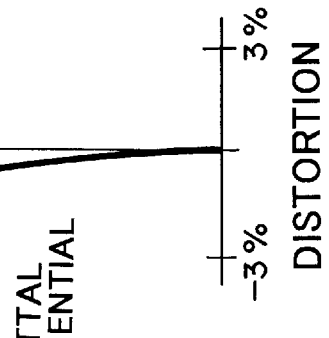
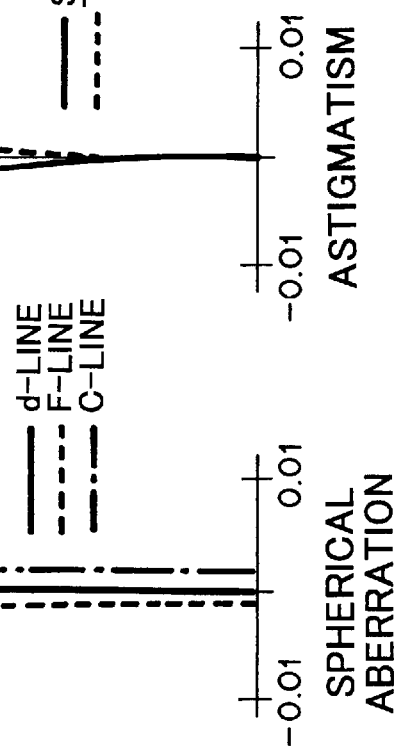

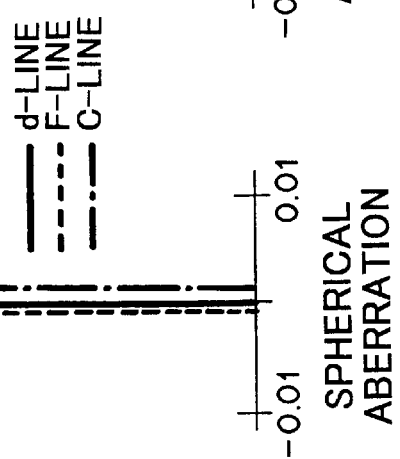
FIG.8A EXAMPLE 2 (MIDDLE) F/2.19
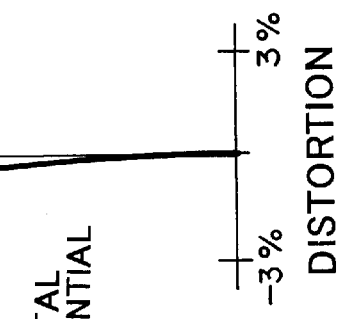
FIG.8B EXAMPLE 2 (MIDDLE) ω=23.7°
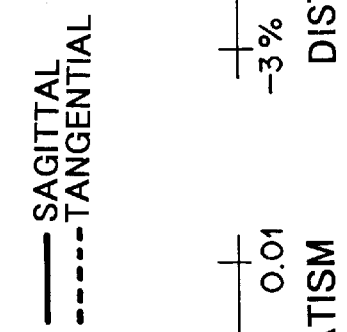
FIG.8C EXAMPLE 2 (MIDDLE) ω=23.7°
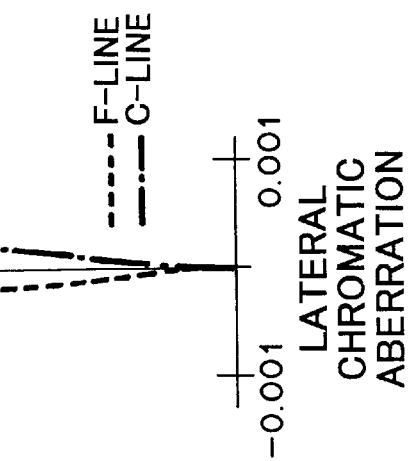
FIG.8D EXAMPLE 2 (MIDDLE) ω=23.7°

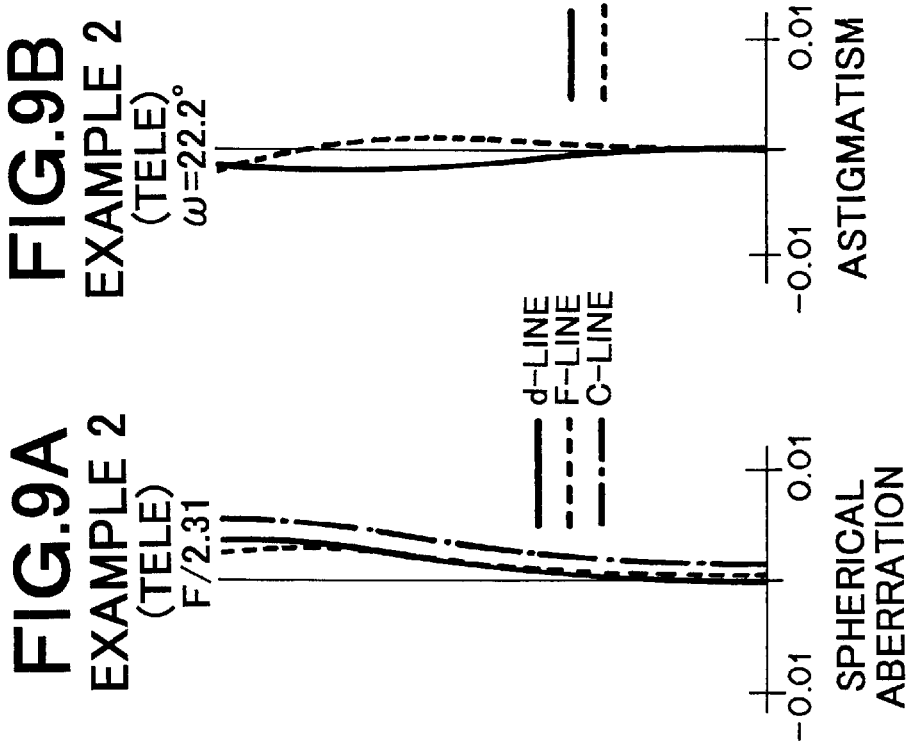

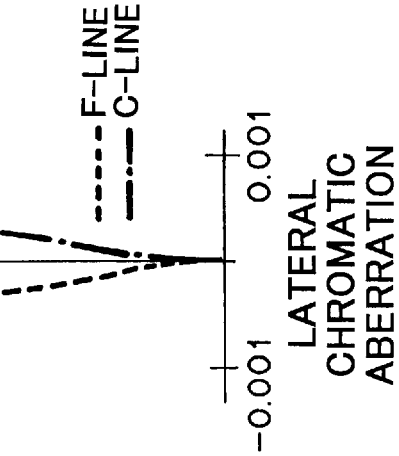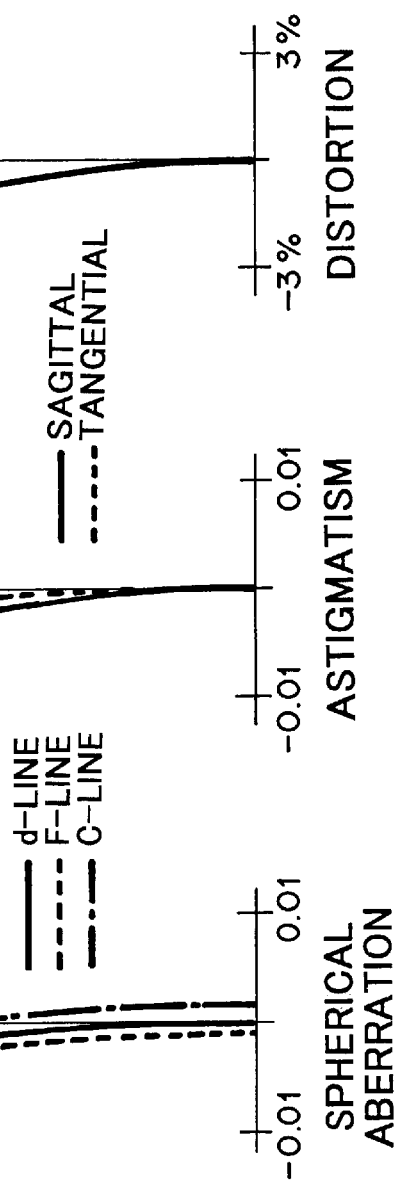

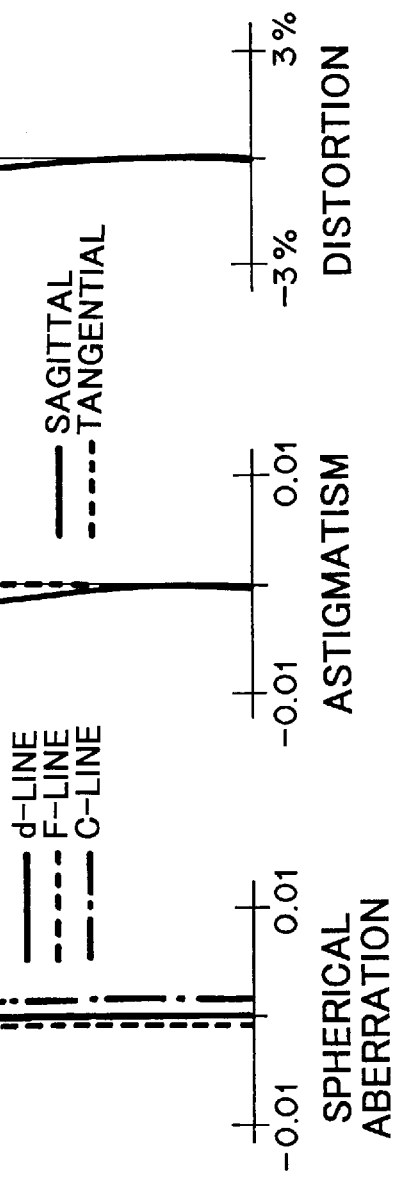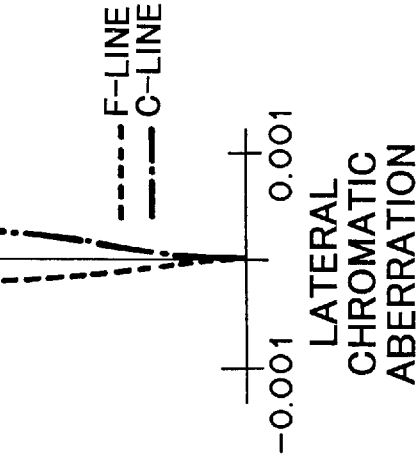

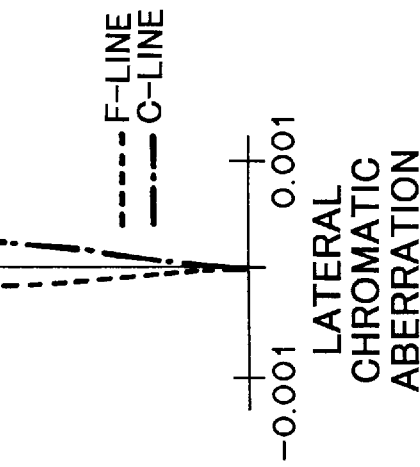
FIG.12A EXAMPLE 3 (TELE) F/2.27
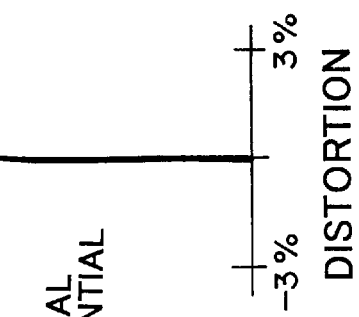
FIG.12B EXAMPLE 3 (TELE) ω=25.2°
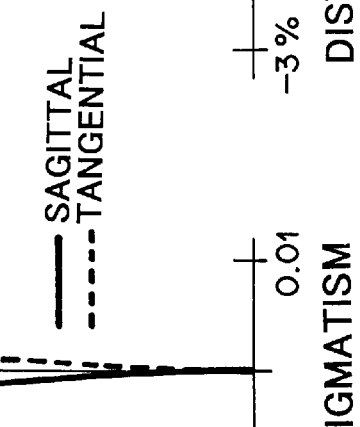
FIG.12C EXAMPLE 3 (TELE) ω=25.2°
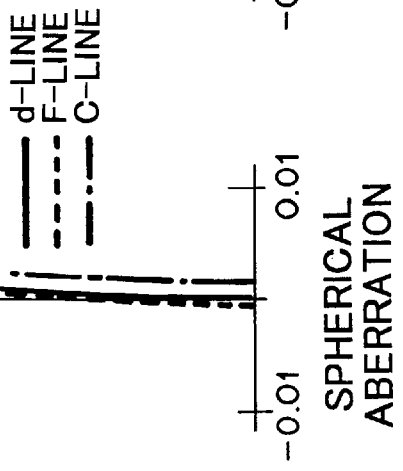
FIG.12D EXAMPLE 3 (TELE) ω=25.2°

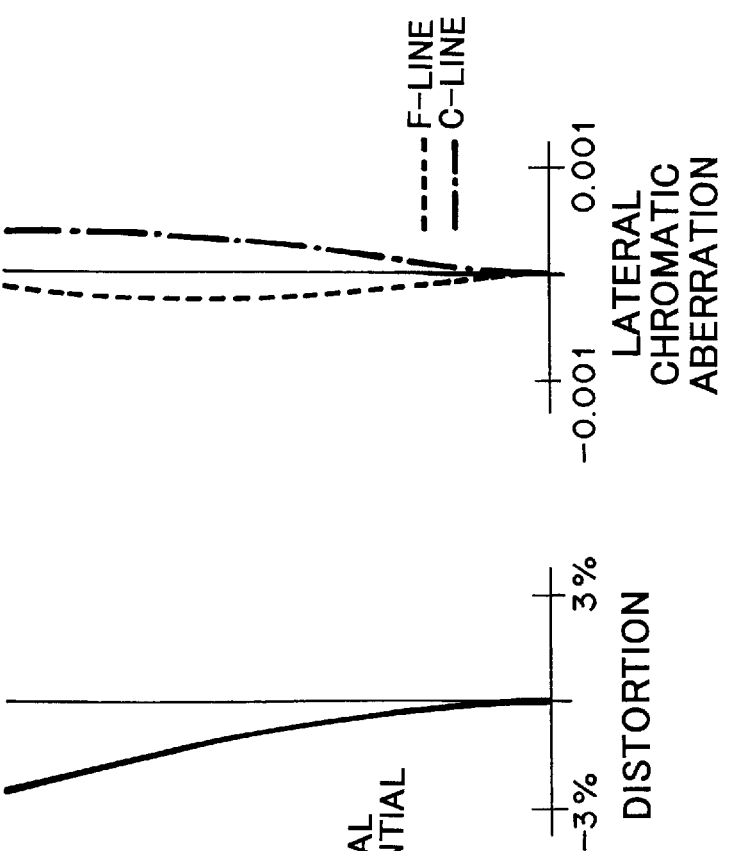
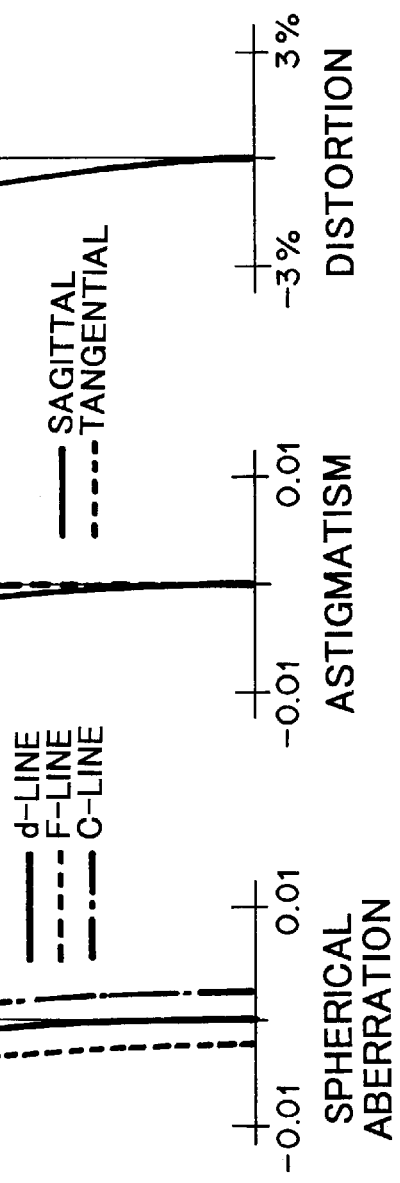

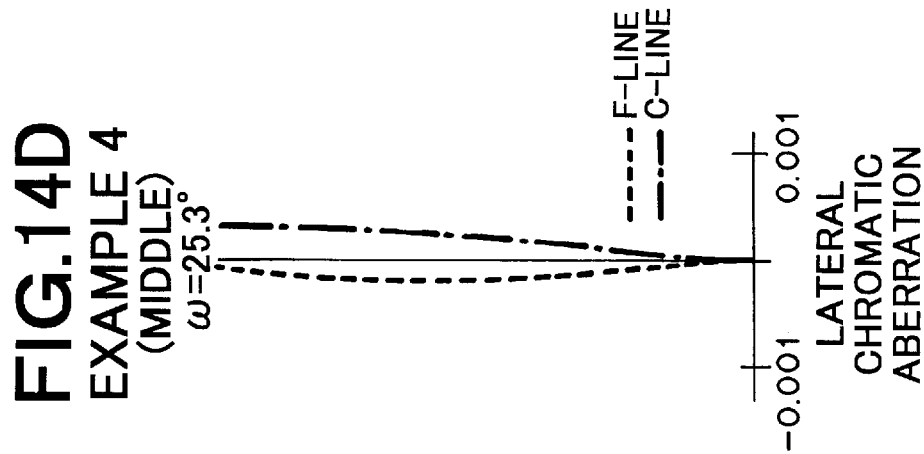
FIG.14A EXAMPLE 4 (MIDDLE) F/2.17
FIG.14B EXAMPLE 4 (MIDDLE) ω=25.3°
FIG.14C EXAMPLE 4 (MIDDLE) ω=25.3°
FIG.14D EXAMPLE 4 (MIDDLE) ω=25.3°

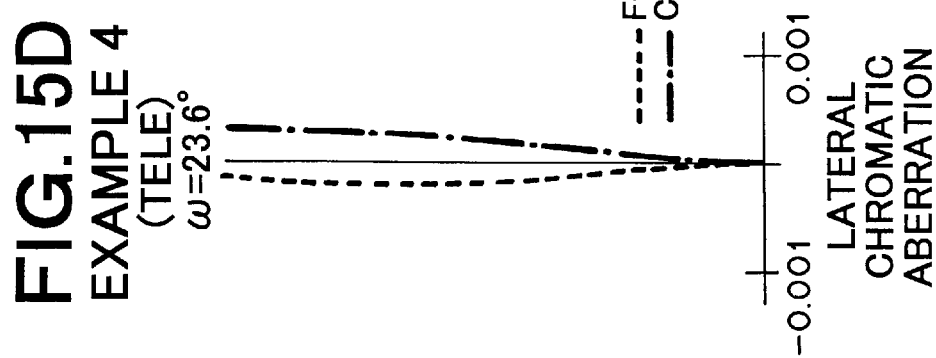
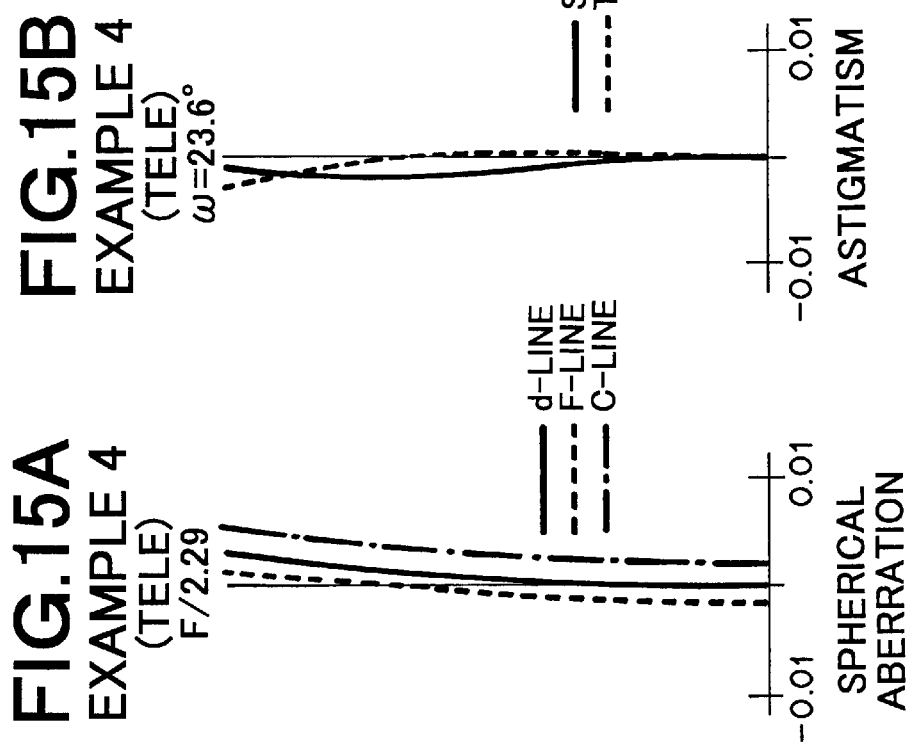

ZOOM LENS AND PROJECTION TYPE DISPLAY APPARATUS USING THE SAME

RELATED APPLICATIONS

This application claims the priority of Japanese Patent Application No. 2000-339955 filed on Nov. 8, 2000, which is incorporated herein by reference.

BACKGROUND OF THE INVENTION

1. Field of the Invention

The present invention relates to an imaging zoom lens for a camera employing an imaging device such as a CCD or image pickup tube, a silver halide film, or the like, or a projecting zoom lens for a projection type TV. In particular, the present invention relates to a projecting zoom lens used in a projection type display apparatus employing a liquid crystal, and a projection type display apparatus using the same.

2. Description of the Prior Art

Known as an example of conventional zoom lenses is one disclosed in Japanese Unexamined Patent Publication 05-297276 or the like comprising a negative first lens group, fixed upon changing power, having a focusing function; a positive second lens group having a power-changing function; a negative third lens group for correcting the image surface movement generated by the change in power; and a fixed positive fourth lens group.

However, most of such zoom lenses have been designed for use in imaging devices having a small size such as CCD. For using these lenses as a projection lens in a projection type display apparatus, it is necessary to increase the reduction-side size of the lens on which the image to be projected is focused, whereby the size of the lens itself becomes considerably large. When use in a projection lens is considered, the conventional technique is often short of distortion correction.

When illumination systems are also taken into consideration, it is desirable that a substantially telecentric optical system be provided on the reduction side of a projection lens in an apparatus using a liquid crystal. However, most of the conventional techniques have not given such consideration. Further, those provided with a back focus allowing a color-decomposing or color-combining optical system to be inserted between a lens system and an imaging surface are few.

For overcoming such a problem, a zoom lens disclosed in Japanese Unexamined Patent Publication No. 10-268193 has been known, which comprises a negative first lens group, fixed upon changing power, having a focusing function; a positive second lens group, a positive third lens group, and a negative fourth lens group which are movable with a mutual relationship for continuously changing power and correcting the image surface movement generated upon the continuous change in power; and a positive fifth lens group fixed upon changing power; and satisfies a predetermined conditional expression.

In recent years, however, there has been a demand for projecting images from a position closer to a large-size screen by using a projection lens having a wider angle. Though the zoom lens disclosed in the above-mentioned Japanese Unexamined Patent Publication No. 10-268193 is supposed to be one achieving a compactness of the lens system for the reduction-side size, an appropriate amount of back focus, and a substantial telecentricity on the reduction side, its angle of view is 23 to 25 degrees, whereby it may not fully satisfy such a demand. Also, there has recently been a strong desire for reducing the size of projection type display apparatus, whereby the projection lens has further been required to reduce its size.

SUMMARY OF THE INVENTION

In view of such circumstances, it is an object of the present invention to provide a zoom lens having a compact configuration with respect to its reduction-side size and a wider angle of view than that conventionally available, while various aberrations are favorably corrected, back focus is long, and light beams within a tangential plane on the reduction side are substantially made uniform with respect to the optical axis. It is another object of the present invention to provide a projection type display apparatus using the above-mentioned zoom lens.

The present invention provides a zoom lens comprising successively from an enlargement side:

a first lens group, fixed upon changing power, having a negative refracting power for focusing;

a second lens group having a positive refracting power, a third lens group having a positive refracting power, and a fourth lens group having a negative refracting power which are movable with a mutual relationship for continuously changing power and correcting an image surface movement generated by the continuous change in power; and a fifth lens group, fixed upon changing power, having a positive refracting power;

the zoom lens satisfying the following conditions (1) to (4):

$$-1.5 < F_1/F < -0.7 \quad (1)$$

$$0.5 < F_2/F < 1.5 \quad (2)$$

$$5.0 < F_3/F < 15.0 \quad (3)$$

$$0.8 < F_5/F < 1.5 \quad (4)$$

where

F is the focal length of the whole lens system at a wide-angle end;

$F_1$ is the focal length of the first lens group;

$F_2$ is the focal length of the second lens group;

$F_3$ is the focal length of the third lens group; and $F_5$ is the focal length of the fifth lens group.

Preferably, the distance between the second and third lens groups is narrowed toward a telephoto end, whereas the second and third lens groups satisfy the following conditional expressions (5) and (6):

$$0.1 < D_2/F < 0.5 \quad (5)$$

$$0.03 < \delta_{D2}/(F \times F_t)^{1/2} < 0.1 \quad (6)$$

where $D_2$ is the lens distance between the second and third lens groups at the wide-angle end;

$\delta_{D2}$ is the absolute value of amount of change in the lens distance between the second and third lens groups in the area ranging from the wide-angle end to the telephoto end; and $F_t$ is the focal length of the whole lens system at the telephoto end.

Preferably, the third lens group comprises two lenses having positive and negative refracting powers, respectively, which are separate from each other or cemented to each other, and satisfies the following conditional expression (7):

$$v_N < 35 \tag{7}$$

where $v_N$ is the Abbe number of the lens having a negative refracting power in the third lens group.

The present invention provides a projection type display apparatus comprising a light source; a light valve; and a projection lens for projecting onto a screen an optical image formed by light modulated by the light valve; wherein the projection lens is the above-mentioned zoom lens.

BRIEF DESCRIPTION OF THE DRAWINGS

FIGS. 1A and 1B are views showing lens configurations of the zoom lens in accordance with Example 1 at its wide-angle and telephoto ends, respectively;

FIG. 2 is a view showing the lens configuration of the zoom lens in accordance with Example 1 at the wide-angle end in detail;

FIGS. 3A and 3B are views showing lens configurations of the zoom lens in accordance with Example 3 at its wide-angle and telephoto ends, respectively;

FIGS. 4A to 4D are aberration charts of the zoom lens in accordance with Example 1 at its wide-angle end;

FIGS. 5A to 5D are aberration charts of the zoom lens in accordance with Example 1 at its middle position;

FIGS. 6A to 6D are aberration charts of the zoom lens in accordance with Example 1 at its telephoto end;

FIGS. 7A to 7D are aberration charts of the zoom lens in accordance with Example 2 at its wide-angle end;

FIGS. 8A to 8D are aberration charts of the zoom lens in accordance with Example 2 at its middle position;

FIGS. 9A to 9D are aberration charts of the zoom lens in accordance with Example 2 at its telephoto end;

FIGS. 10A to 10D are aberration charts of the zoom lens in accordance with Example 3 at its wide-angle end;

FIGS. 11A to 11D are aberration charts of the zoom lens in accordance with Example 3 at its middle position;

FIGS. 12A to 12D are aberration charts of the zoom lens in accordance with Example 3 at its telephoto end;

FIGS. 13A to 13D are aberration charts of the zoom lens in accordance with Example 4 at its wide-angle end;

FIGS. 14A to 14D are aberration charts of the zoom lens in accordance with Example 4 at its middle position; and FIGS. 15A to 15D are aberration charts of the zoom lens in accordance with Example 4 at its telephoto end.

DESCRIPTION OF THE PREFERRED EMBODIMENTS

In the following, an embodiment of the present invention will be explained with reference to the drawings. FIGS. 1A and 1B show a basic configuration of the zoom lens of Example 1 in accordance with the present invention, which will be explained later. Namely, they are (wide and tele) lens configurational views at wide-angle and telephoto ends, respectively. This lens will be explained in the following as a representative of the embodiment. FIG. 2 is an enlarged view of the lens configuration at the wide-angle end shown in FIG. 1A.

This lens comprises, successively from the enlargement side, a first lens group $G_1$, fixed upon changing power, having a negative refracting power for focusing; a second lens group $G_2$ having a positive refracting power, a third lens group $G_3$ having a positive refracting power, and a fourth lens group $G_4$ having a negative refracting power which are movable with a mutual relationship for continuously changing power and correcting an image surface movement generated by the continuous change in power; and a fifth lens group $G_5$, fixed upon changing power, having a positive refracting power. The third lens group $G_3$ is constituted by two lenses, i.e., a lens (sixth lens $L_6$ in FIGS. 1A and 1B) having a positive refracting power and a lens (fifth lens $L_5$ in FIGS. 1A and 1B) having a negative refracting power. Disposed between the fifth lens group $G_5$ and an imaging surface 1 is a glass block 2 which corresponds to a filter for cutting infrared rays, a low-pass filter, and a color-combining optical system (color-decomposing optical system). In the drawings, X indicates the optical axis.

The first lens group $G_1$ is fixed upon changing power and has a focusing function. The second, third, and fourth lens groups $G_2$, $G_3$, and $G_4$ are movable with a mutual relationship, thereby functioning to continuously change power and correct the image surface movement generated by the continuous change in power. The fifth lens group $G_5$ is a relay lens fixed upon changing power. The distance between the second lens group $G_2$ and the third lens group $G_3$ is narrowed toward the telephoto end upon changing power.

Further, the zoom lens is configured so as to satisfy the following conditional expressions (1) to (7):

$$-1.5 < F_1/F < -0.7 \tag{1}$$

$$0.5 < F_2/F < 1.5 \tag{2}$$

$$5.0 < F_3/F < 15.0 \tag{3}$$

$$0.8 < F_5/F < 1.5 \tag{4}$$

$$0.1 < D_2/F < 0.5 \tag{5}$$

$$0.03 < \delta_{D2}/(F \times F_t)^{1/2} < 0.1 \tag{6}$$

$$v_N < 35 \tag{7}$$

where

F is the focal length of the whole lens system at the wide-angle end;

$F_t$ is the focal length of the whole lens system at the telephoto end;

$F_1$ is the focal length of the first lens group $G_1$;

$F_2$ is the focal length of the second lens group $G_2$;

$F_3$ is the focal length of the third lens group $G_3$;

$F_5$ is the focal length of the fifth lens group $G_5$;

$D_2$ is the lens distance between the second lens group $G_2$ and third lens group $G_3$ at the wide-angle end;

$\delta_{D2}$ is the absolute value of amount of change in the lens distance between the second lens group $G_2$ and third lens group $G_3$ in the area ranging from the wide-angle end to the telephoto end; and $v_N$ is the Abbe number of the lens having a negative refracting power in the third lens group $G_3$.

The projection type image display apparatus in accordance with the present invention is an apparatus comprising a light source, a light valve, and the zoom lens in accordance with the present invention. In this apparatus, the zoom lens in accordance with the present invention functions as a projection lens for projecting onto a screen an optical image generated by light modulated by the light valve. For example, in the case of a liquid crystal video projector equipped with the zoom lens shown in FIGS. 1A and 1B, a substantially parallel luminous flux enters from a light source unit (not depicted) on the right side of the drawing. The luminous flux carrying the image information produced at the imaging surface 1 of the light valve such as a liquid crystal display panel is enlarged by the zoom lens by way of the glass block 2 so as to be projected onto a screen (not depicted) on the left side of the drawing. Though only one imaging surface 1 is shown in FIGS. 1A and 1B, a liquid crystal video projector is typically configured such that a luminous flux from a light source is decomposed into three primary color light components of R, G, and B by a color-decomposing optical system constituted by a dichroic mirror and a lens array, whereas three liquid crystal display panels are provided for the respective primary color light components, so that full-color images can be displayed. The glass block 2 may be a dichroic prism for combining the three primary color light components.

Operations and effects of the zoom lens in accordance with this embodiment and the projection type display apparatus using the same will now be explained.

First, since the second lens group $G_2$ having a positive refracting power, the third lens group $G_3$ having a positive refracting power, and the fourth lens group $G_4$ having a negative refracting power are made movable with a mutual relationship in order to continuously change power and correct the image surface movement generated by the continuous change in power, the fluctuation in aberrations caused by zooming can be lowered. Since predetermined lens groups are configured such that their powers satisfy the above-mentioned conditional expressions (1) to (4), it is possible to obtain a zoom lens in which moving distances of lens groups are short, the total lens length is compact, and various aberrations are favorably corrected, while a predetermined zoom ratio is secured.

Since the distance between the second lens group $G_2$ and third lens group $G_3$ is configured so as to become narrower toward the telephoto end, the moving distance necessary for zooming can be shortened, whereby the total lens system can be made more compact.

The individual conditional expressions will now be explained. If the negative power of the first lens group $G_1$ is weakened such that the lower limit of conditional expression (1) is not satisfied, aberrations of a lens having a small F value may be harder to correct, or the amount of movement of the first lens group $G_1$ caused by focusing will increase so that aberrations may fluctuate greatly. If the negative power is strengthened such that the upper limit of conditional expression (1) is exceeded, the axial light beam will be kicked up by the first lens group $G_1$ so much that aberrations such as distortion and spherical aberration, in particular, may be harder to correct.

If the positive power of the second lens group $G_2$ is weakened such that the upper limit of conditional expression (2) is exceeded, the amount of movement upon changing power will be so large that the lens size may increase. If the positive power of the second lens group $G_2$ is strengthened such that the lower limit of conditional expression (2) is not satisfied, aberrations will be harder to correct. If the positive power of the third lens group $G_3$ is weakened such that the upper limit of conditional expression (3) is exceeded, the amount of movement upon changing power will be so large that the lens may increase its size. If the positive power of the third lens group $G_3$ is strengthened such that the lower limit of conditional expression (3) is not satisfied, aberrations may be harder to correct.

If the positive power of the fifth lens group $G_5$ is strengthened such that the lower limit of conditional expression (4) is not satisfied, back focus will be shortened, and it may be harder to attain a substantially telecentric state on the reduction side. If this lower limit is satisfied, the zoom lens can secure a predetermined back focus, and a dichroic prism for combining colors required for projecting color images can be inserted at the position where the glass block 2 is located. If the positive power of the fifth lens group $G_5$ is weakened such that the upper limit of conditional expression (4) is exceeded, the back focus will be so long that the size including the lens back may become larger. Further, the axial light beam height in the fifth lens group $G_5$ will be so low that aberrations may be harder to correct.

If the lens distance between the second lens group $G_2$ and third lens group $G_3$ is so short that the lower limit of conditional expression (5) is not satisfied, various aberrations such as distortion, in particular, may be out of balance. If the lens distance between the second lens group $G_2$ and third lens group $G_3$ is so long that the upper limit of conditional expression (5) is exceeded, the total size may become greater. If the amount of change is so large that the upper limit of conditional expression (6) is exceeded, it may be harder to correct the fluctuation in aberrations caused by zooming. If the amount of change is so small that the lower limit of conditional expression (6) is not satisfied, the amount of movement of the second lens group $G_2$ and third lens group $G_3$ required for zooming may become greater. If the upper limit of conditional expression (7) is exceeded, chromatic aberration may be harder to correct.

Since the zoom lens of this embodiment is configured as such, it is a zoom lens achieving favorable aberration correction, an appropriate amount of back focus, and a substantial telecentricity on the reduction side, while being compact for the reduction-side size and having a wider angle of view than that conventionally available. Therefore, when this zoom lens is used in a projection type display apparatus, such an appropriate amount of back focus that a color-combining optical system or the like can be inserted at a predetermined position can be obtained. Also, such a zoom lens having a wider angle of view can project images from a position closer to a large-size screen, while the apparatus itself can be made compact.

EXAMPLES

In the following, Examples will be explained specifically with reference to data.

Example 1

The zoom lens in accordance with Example 1 has a configuration shown in FIGS. 1A and 1B as mentioned above. Namely, successively from the enlargement side, the first lens group $G_1$ in this lens is constituted by a first lens $L_1$ made of a negative meniscus lens having a convex surface directed onto the enlargement side and a second lens $L_2$ made of a biconcave lens having a surface with a stronger curvature directed onto the reduction side; the second lens group $G_2$ is constituted by a third lens $L_3$ made of a biconvex lens having a surface with a greater curvature directed onto the reduction side and a fourth lens $L_4$ made of a positive meniscus lens having a convex surface directed onto the enlargement side; the third lens group $G_3$ is constituted by a fifth lens $L_5$ made of a biconcave lens having a surface with a stronger curvature directed onto the reduction side and a sixth lens $L_6$ made of a biconvex lens having a surface with a stronger curvature directed onto the reduction side;

the fourth lens group $G_4$ is constituted by a seventh lens $L_7$ made of a negative meniscus lens having a convex surface directed onto the enlargement side; and the fifth lens group $G_5$ is constituted by a cemented lens of an eighth lens $L_8$ made of a biconcave lens having a surface with a stronger curvature directed onto the enlargement side and a ninth lens $L_9$ made of a biconvex lens having a surface with a stronger curvature directed onto the reduction side, a tenth lens $L_{10}$ made of a positive meniscus lens having a convex surface directed onto the reduction side, and an eleventh lens $L_{11}$ made of a biconvex lens having a surface with a stronger curvature directed onto the enlargement side.

The upper part of Table 1 shows the radius of curvature R (standardized with the focal length at the wide-angle end being taken as 1, as in each of the following tables) of each lens surface, the center thickness of each lens and air space between each pair of neighboring lenses D (standardized with the same focal length as in the above-mentioned radius of curvature R, as in each of the following tables), and the refractive index N and Abbe number ν of each lens at d-line. In Table 1 and its subsequent Tables 2 to 4, numbers referring to each of the letters R, D, N, and ν successively increase from the enlargement side.

The lower part of Table 1 shows the distance $D_4$ (movement 1) between the first lens group $G_1$ and second lens group $G_2$, distance $D_8$ (movement 2) between the second lens group $G_2$ and third lens group $G_3$, distance $D_{12}$ (movement 3) between the third lens group $G_3$ and fourth lens group $G_4$, and distance $D_{14}$ (movement 4) between the fourth lens group $G_4$ and fifth lens group $G_5$ at each of the wide-angle end (wide), middle position (middle), and telephoto end (tele); and respective focal lengths at the wide-angle and telephoto ends. Table 5 shows values corresponding to the above-mentioned conditional expressions (1) to (7) in Example 1.

FIGS. 4A to 4D, FIGS. 5A to 5D, and FIGS. 6A to 6D are aberration charts showing various aberrations (spherical aberration, astigmatism, distortion, and lateral chromatic aberration) of the zoom lens in accordance with Example 1 at the wide-angle end (wide), middle position (middle), and telephoto end (tele). In each of astigmatism charts of FIGS. 4B to 6B and their subsequent FIGS. 7B to 15B, respective aberrations concerning sagittal and tangential image surfaces are shown. In each of the charts of FIGS. 4D to 15D showing lateral chromatic aberration, the aberration concerning d-line is depicted.

As can be seen from FIGS. 4A to 6D and Table 5, the zoom lens of Example 1 makes it possible to favorably correct aberrations over the whole zoom region, yield a compact configuration for its reduction-side size, form an appropriate size of back focus, cause a pencil of rays within a tangential plane on the reduction side to become substantially parallel and symmetrical about the optical axis, and attain a half angle of view of ω=29.4 degrees at the wide-angle end, thus yielding a lens having a wider angle of view than that conventionally available.

Example 2

The zoom lens in accordance with Example 2 has a configuration substantially the same as that of Example 1. It differs from Example 1 in that the second lens $L_2$ is made of a biconcave lens having a surface with a greater curvature directed onto the enlargement side, and that the fourth lens $L_4$ is made of a biconvex lens having a surface with a stronger curvature directed onto the enlargement side. The upper part of Table 2 shows the radius of curvature R of each lens surface, the center thickness of each lens and air space between each pair of neighboring lenses D, and the refractive index N and Abbe number ν of each lens at d-line in Example 2.

The lower part of Table 2 shows the distance $D_4$ (movement 1) between the first lens group $G_1$ and second lens group $G_2$, distance $D_8$ (movement 2) between the second lens group $G_2$ and third lens group $G_3$, distance $D_{12}$ (movement 3) between the third lens group $G_3$ and fourth lens group $G_4$, and distance $D_{14}$ (movement 4) between the fourth lens group $G_4$ and fifth lens group $G_5$ at each of the wide-angle end (wide), middle position (middle), and telephoto end (tele); and respective focal lengths at the wide-angle and telephoto ends. Table 5 shows values corresponding to the above-mentioned conditional expressions (1) to (7) in Example 2.

FIGS. 7A to 7D, FIGS. 8A to 8D, and FIGS. 9A to 9D are aberration charts showing various aberrations (spherical aberration, astigmatism, distortion, and lateral chromatic aberration) of the zoom lens in accordance with Example 2 at the wide-angle end (wide), middle position (middle), and telephoto end (tele).

As can be seen from FIGS. 7A to 9D and Table 5, the zoom lens of Example 2 makes it possible to favorably correct aberrations over the whole zoom region, yield a compact configuration for its reduction-side size, form an appropriate size of back focus, cause a pencil of rays within a tangential plane on the reduction side to become substantially parallel and symmetrical about the optical axis, and attain a half angle of view of ω=25.8 degrees at the wide-angle end, thus yielding a lens having a wider angle of view than that conventionally available.

Example 3

FIGS. 3A and 3B show a basic configuration of the zoom lens in accordance with Example 3 of the present invention. Namely, they are (wide and tele) lens configurational views at wide-angle and telephoto ends, respectively.

The zoom lens in accordance with Example 3 has a configuration substantially the same as that of Example 1 but differs therefrom in that the first lens group $G_1$ having a negative refracting power is constituted by three lenses. Namely, successively from the enlargement side, the first lens group $G_1$ in this lens is constituted by a first lens $L_1$ made of a positive meniscus lens having a convex surface directed onto the enlargement side, a second lens $L_2$ made of a negative meniscus lens having a convex surface directed onto the enlargement side, and a third lens $L_3$ made of a biconcave lens having a surface with a stronger curvature directed onto the reduction side; the second lens group $G_2$ is constituted by a fourth lens $L_4$ made of a biconvex lens having a surface with a stronger curvature directed onto the reduction side and a fifth lens $L_5$ made of a biconvex lens having a surface with a stronger curvature directed onto the enlargement side; the third lens group $G_3$ is constituted by a sixth lens $L_6$ made of a biconcave lens having a surface with a stronger curvature directed onto the reduction side and a seventh lens $L_7$ made of a biconvex lens having a surface with a stronger curvature directed onto the reduction side; the fourth lens group $G_4$ is constituted by an eighth lens $L_8$ made of a negative meniscus lens having a convex surface directed onto the enlargement side; the fifth lens group $G_5$ is constituted by a cemented lens of a ninth lens $L_9$ made of a biconcave lens having a surface with a stronger curvature directed onto the enlargement side and a tenth lens $L_{10}$ made of a biconvex lens having a surface with a stronger curvature directed onto the reduction side, an eleventh lens $L_{11}$ made of a positive meniscus lens having a convex surface directed onto the reduction side, and a twelfth lens $L_{12}$ made of a biconvex lens having a surface with a stronger curvature directed onto the enlargement side.

The upper part of Table 3 shows the radius of curvature R of each lens surface, the center thickness of each lens and air space between each pair of neighboring lenses D, and the refractive index N and Abbe number ν of each lens at d-line in Example 3.

The lower part of Table 3 shows the distance $D_6$ (movement 1) between the first lens group $G_1$ and second lens group $G_2$, distance $D_{10}$ (movement 2) between the second lens group $G_2$ and third lens group $G_3$, distance $D_{14}$ (movement 3) between the third lens group $G_3$ and fourth lens group $G_4$, and distance $D_{17}$ (movement 4) between the fourth lens group $G_4$ and fifth lens group $G_5$ at each of the wide-angle end (wide), middle position (middle), and telephoto end (tele); and respective focal lengths at the wide-angle and telephoto ends. Table 5 shows values corresponding to the above-mentioned conditional expressions (1) to (7) in Example 3.

FIGS. 10A to 10D, FIGS. 11A to 11D, and FIGS. 12A to 12D are aberration charts showing various aberrations (spherical aberration, astigmatism, distortion, and lateral chromatic aberration) of the zoom lens in accordance with Example 3 at the wide-angle end (wide), middle position (middle), and telephoto end (tele).

As can be seen from FIGS. 10A to 12D and Table 5, the zoom lens of Example 3 makes it possible to favorably correct aberrations over the whole zoom region, yield a compact configuration for its reduction-side size, form an appropriate size of back focus, cause a pencil of rays within a tangential plane on the reduction side to become substantially parallel and symmetrical about the optical axis, and attain a half angle of view of ω=29.3 degrees at the wide-angle end, thus yielding a lens having a wider angle of view than that conventionally available.

Example 4

The zoom lens in accordance with Example 4 has a configuration substantially the same as that of Example 1. It differs from Example 1 in that the tenth lens $L_{10}$ is made of a biconvex lens having a surface with a stronger curvature directed onto the reduction side. The upper part of Table 4 shows the radius of curvature R of each lens surface, the center thickness of each lens and air space between each pair of neighboring lenses D, and the refractive index N and Abbe number ν of each lens at d-line in Example 4.

The lower part of Table 4 shows the distance $D_4$ (movement 1) between the first lens group $G_1$ and second lens group $G_2$, distance $D_8$ (movement 2) between the second lens group $G_2$ and third lens group $G_3$, distance $D_{12}$ (movement 3) between the third lens group $G_3$ and fourth lens group $G_4$, and distance $D_{14}$ (movement 4) between the fourth lens group $G_4$ and fifth lens group $G_5$ at each of the wide-angle end (wide), middle position (middle), and telephoto end (tele); and respective focal lengths at the wide-angle and telephoto ends. Table 5 shows values corresponding to the above-mentioned conditional expressions (1) to (7) in Example 4.

FIGS. 13A to 13D, FIGS. 14A to 14D, and FIGS. 15A to 15D are aberration charts showing various aberrations (spherical aberration, astigmatism, distortion, and lateral chromatic aberration) of the zoom lens in accordance with Example 4 at the wide-angle end (wide), middle position (middle), and telephoto end (tele).

As can be seen from FIGS. 13A to 15D and Table 5, the zoom lens of Example 4 makes it possible to favorably correct aberrations over the whole zoom region, yield a compact configuration for its reduction-side size, form an appropriate size of back focus, cause a pencil of rays within a tangential plane on the reduction side to become substantially parallel and symmetrical about the optical axis, and attain a half angle of view of ω=27.4 degrees at the wide-angle end, thus yielding a lens having a wider angle of view than that conventionally available.

Without being restricted to those of the above-mentioned Examples, the zoom lens in accordance with the present invention can be modified in various manners. For example, the number of lenses constituting each lens group, radius of curvature R and lens space (or lens thickness) D of each lens can be changed as appropriate. The respective lenses with positive and negative refracting powers constituting the third lens group $G_3$ may be cemented to each other.

Though the above-mentioned Examples use the lens of the present invention as a projection lens in a projection type display apparatus using a transmission type liquid crystal display panel, the mode of use of the zoom lens in accordance with the present invention is not limited thereto. For example, it can be used as a projection lens or the like of an apparatus using a reflection type liquid crystal display panel or other light modulation means such as digital mirror device (DMD). Also, it can be used as an imaging lens having a zooming function employed in imaging means such as CCD and image pickup tubes, and cameras using silver halide films and the like.

As explained in the foregoing, the zoom lens of the present invention is constructed as a five-group type in which the second and third lens groups each having a positive refracting power and the fourth lens group having a negative refracting power are made movable, whereas the focal length of each group and the like are set within appropriate ranges as mentioned above, whereby it can reduce the fluctuation in aberrations caused by zooming while attaining a wider angle of view than that conventionally available. Also, it is possible to yield a compact configuration for its reduction-side size, cause a pencil of rays within a tangential plane on the reduction side to become substantially uniform with respect to the optical axis, and attain such an appropriate back focus amount that a color-combining optical system or the like can be inserted at a predetermined position, whereby a projection type display apparatus using the zoom lens of the present invention can become a compact apparatus having a wide angle of view and favorably corrected aberrations.

TABLE 1

| Surface | R | D | $N_d$ | $\nu_d$ |
|---|---|---|---|---|
| 1 | 1.416 | 0.051 | 1.80400 | 46.6 |
| 2 | 0.795 | 0.313 | | |
| 3 | −3.798 | 0.051 | 1.51633 | 64.1 |
| 4 | 1.782 | (movement 1) | | |
| 5 | 3.647 | 0.249 | 1.71300 | 53.9 |
| 6 | −2.315 | 0.008 | | |

TABLE 1-continued

| | | | | |
|---|---|---|---|---|
| 7 | 1.513 | 0.161 | 1.78472 | 25.7 |
| 8 | 6.706 | (movement 2) | | |
| 9 | -11.765 | 0.038 | 1.84666 | 23.8 |
| 10 | 1.611 | 0.003 | | |
| 11 | 1.745 | 0.154 | 1.63854 | 55.4 |
| 12 | -1.641 | (movement 3) | | |
| 13 | 1.404 | 0.038 | 1.62299 | 58.2 |
| 14 | 0.826 | (movement 4) | | |
| 15 | -0.534 | 0.042 | 1.80518 | 25.4 |
| 16 | 4.242 | 0.309 | 1.51633 | 64.1 |
| 17 | -0.760 | 0.008 | | |
| 18 | -32.755 | 0.265 | 1.77250 | 49.6 |
| 19 | -1.258 | 0.008 | | |
| 20 | 2.815 | 0.218 | 1.83400 | 37.2 |
| 21 | -6.295 | 0.300 | | |
| 22 | ∞ | 1.167 | 1.51633 | 64.1 |
| 23 | ∞ | | | |

| | | Wide | Middle | Tele |
|---|---|---|---|---|
| Focal length | | | 1.0 to 1.1 | |
| | Movement 1 | 0.441 | 0.394 | 0.351 |
| Moving | Movement 2 | 0.335 | 0.309 | 0.285 |
| distance | Movement 3 | 0.290 | 0.380 | 0.472 |
| | Movement 4 | 0.302 | 0.286 | 0.261 |

TABLE 2

| Surface | R | D | $N_d$ | $\nu_d$ |
|---|---|---|---|---|
| 1 | 1.452 | 0.046 | 1.65844 | 50.9 |
| 2 | 0.654 | 0.253 | | |
| 3 | -1.656 | 0.046 | 1.51633 | 64.1 |
| 4 | 4.095 | (movement 1) | | |
| 5 | 6.635 | 0.142 | 1.77250 | 49.6 |
| 6 | -2.169 | 0.008 | | |
| 7 | 1.208 | 0.166 | 1.80610 | 40.9 |
| 8 | -152.270 | (movement 2) | | |
| 9 | -7.254 | 0.035 | 1.80518 | 25.4 |
| 10 | 1.919 | 0.003 | | |
| 11 | 2.118 | 0.134 | 1.62041 | 60.3 |
| 12 | -1.508 | (movement 3) | | |
| 13 | 1.493 | 0.035 | 1.48749 | 70.2 |
| 14 | 0.776 | (movement 4) | | |
| 15 | -0.475 | 0.038 | 1.80518 | 25.4 |
| 16 | 2.972 | 0.281 | 1.58913 | 61.1 |
| 17 | -0.720 | 0.008 | | |
| 18 | -21.862 | 0.194 | 1.83481 | 42.7 |
| 19 | -1.405 | 0.008 | | |
| 20 | 2.424 | 0.198 | 1.83400 | 37.2 |
| 21 | -4.617 | 0.200 | | |
| 22 | ∞ | 1.009 | 1.51633 | 64.1 |
| 23 | ∞ | | | |

| | | Wide | Middle | Tele |
|---|---|---|---|---|
| Focal length | | | 1.00 to 1.15 | |
| | Movement 1 | 0.257 | 0.198 | 0.151 |
| Moving | Movement 2 | 0.285 | 0.247 | 0.215 |
| distance | Movement 3 | 0.206 | 0.335 | 0.457 |
| | Movement 4 | 0.312 | 0.280 | 0.235 |

TABLE 3

| Surface | R | D | $N_d$ | $\nu_d$ |
|---|---|---|---|---|
| 1 | 1.917 | 0.182 | 1.51633 | 64.1 |
| 2 | 4.240 | 0.008 | | |
| 3 | 1.705 | 0.050 | 1.80400 | 46.6 |
| 4 | 0.722 | 0.330 | | |
| 5 | -3.201 | 0.050 | 1.48749 | 70.2 |
| 6 | 1.812 | (movement 1) | | |
| 7 | 10.702 | 0.138 | 1.84666 | 23.9 |
| 8 | -3.168 | 0.008 | | |
| 9 | 1.197 | 0.226 | 1.71300 | 53.9 |
| 10 | -6.481 | (movement 2) | | |
| 11 | -18.579 | 0.038 | 1.75520 | 27.5 |
| 12 | 1.682 | 0.003 | | |
| 13 | 1.863 | 0.144 | 1.48749 | 70.2 |
| 14 | -1.403 | (movement 3) | | |
| 15 | 1.893 | 0.038 | 1.71300 | 53.9 |
| 16 | 0.927 | (movement 4) | | |
| 17 | -0.474 | 0.042 | 1.80518 | 25.4 |
| 18 | 2.715 | 0.317 | 1.57135 | 53.0 |
| 19 | -0.741 | 0.008 | | |
| 20 | -19.751 | 0.275 | 1.80400 | 46.6 |
| 21 | -1.196 | 0.008 | | |
| 22 | 2.357 | 0.238 | 1.77250 | 49.6 |
| 23 | -6.755 | 0.400 | | |
| 24 | ∞ | 1.144 | 1.51633 | 64.1 |
| 25 | ∞ | | | |

| | | Wide | Middle | Tele |
|---|---|---|---|---|
| Focal length | | | 1.00 to 1.15 | |
| | Movement 1 | 0.266 | 0.205 | 0.158 |
| Moving | Movement 2 | 0.282 | 0.249 | 0.218 |
| distance | Movement 3 | 0.132 | 0.275 | 0.407 |
| | Movement 4 | 0.353 | 0.302 | 0.249 |

TABLE 4

| Surface | R | D | $N_d$ | $\nu_d$ |
|---|---|---|---|---|
| 1 | 1.630 | 0.050 | 1.51633 | 64.1 |
| 2 | 0.772 | 0.282 | | |
| 3 | -35.369 | 0.050 | 1.62041 | 60.3 |
| 4 | 1.447 | (movement 1) | | |
| 5 | 2.850 | 0.218 | 1.71300 | 53.9 |
| 6 | -2.300 | 0.008 | | |
| 7 | 1.437 | 0.148 | 1.80518 | 25.4 |
| 8 | 3.913 | (movement 2) | | |
| 9 | -11.753 | 0.038 | 1.84666 | 23.8 |
| 10 | 1.808 | 0.003 | | |
| 11 | 1.960 | 0.151 | 1.51633 | 64.1 |
| 12 | -1.493 | (movement 3) | | |
| 13 | 1.548 | 0.038 | 1.67003 | 47.3 |
| 14 | 0.852 | (movement 4) | | |
| 15 | -0.518 | 0.042 | 1.75520 | 27.5 |
| 16 | 3.996 | 0.324 | 1.51633 | 64.1 |
| 17 | -0.741 | 0.008 | | |
| 18 | 686.762 | 0.268 | 1.71300 | 53.9 |
| 19 | -1.290 | 0.008 | | |
| 20 | 2.461 | 0.222 | 1.80610 | 40.9 |
| 21 | -7.870 | 0.420 | | |
| 22 | ∞ | 1.145 | 1.51633 | 64.1 |
| 23 | ∞ | | | |

| | | Wide | Middle | Tele |
|---|---|---|---|---|
| Focal length | | | 1.00 to 1.15 | |
| | Movement 1 | 0.562 | 0.484 | 0.424 |
| Moving | Movement 2 | 0.290 | 0.248 | 0.210 |
| distance | Movement 3 | 0.245 | 0.394 | 0.530 |
| | Movement 4 | 0.335 | 0.307 | 0.268 |

TABLE 5

| | | Example 1 | Example 2 | Example 3 | Example 4 |
|---|---|---|---|---|---|
| Conditional expression (1) | $F_1/F$ | −1.09 | −0.96 | −1.09 | −1.20 |
| Conditional expression (2) | $F_2/F$ | 1.12 | 0.88 | 0.97 | 1.10 |
| Conditional expression (3) | $F_3/F$ | 5.96 | 5.45 | 7.80 | 12.53 |
| Conditional expression (4) | $F_5/F$ | 1.21 | 1.15 | 1.09 | 1.18 |
| Conditional expression (5) | $D_2/F$ | 0.34 | 0.29 | 0.28 | 0.29 |
| Conditional expression (6) | $\delta_{D2}/(F \times F_t)^{1/2}$ | 0.05 | 0.07 | 0.06 | 0.07 |
| Conditional expression (7) | $\nu_N$ | 23.8 | 25.4 | 27.5 | 23.8 |

What is claimed is:

1. A zoom lens comprising successively from an enlargement side:

a first lens group, fixed upon changing power, having a negative refracting power for focusing;

a second lens group having a positive refracting power, a third lens group having a positive refracting power, and a fourth lens group having a negative refracting power which are movable with a mutual relationship for continuously changing power and correcting an image surface movement generated by said continuous change in power; and a fifth lens group, fixed upon changing power, having a positive refracting power;

said zoom lens satisfying the following conditions (1) to (4):

$$-1.5 < F_1/F < -0.7 \quad (1)$$

$$0.5 < F_2/F < 1.5 \quad (2)$$

$$5.0 < F_3/F < 15.0 \quad (3)$$

$$0.8 < F_5/F < 1.5 \quad (4)$$

where

F is the focal length of the whole lens system at a wide-angle end;

$F_1$ is the focal length of the first lens group;

$F_2$ is the focal length of the second lens group;

$F_3$ is the focal length of the third lens group; and $F_5$ is the focal length of the fifth lens group.

2. A zoom lens according to claim 1, wherein said second and third lens groups have a distance therebetween narrowed toward a telephoto end.

3. A zoom lens according to claim 1, wherein said second and third lens groups satisfy the following conditional expressions (5) and (6):

$$0.1 < D_2/F < 0.5 \quad (5)$$

$$0.03 < \delta_{D2}/(F \times F_t)^{1/2} < 0.1 \quad (6)$$

where $D_2$ is the lens distance between the second and third lens groups at the wide-angle end;

$\delta_{D2}$ is the absolute value of amount of change in the lens distance between the second and third lens groups in the area ranging from the wide-angle end to the telephoto end; and $F_t$ is the focal length of the whole lens system at the telephoto end.

4. A zoom lens according to claim 1, wherein said third lens group comprises two lenses having positive and negative refracting powers, respectively, which are separate from each other or cemented to each other, and satisfies the following conditional expression (7):

$$\nu_N < 35 \quad (7)$$

where $\nu_N$ is the Abbe number of the lens having a negative refracting power in the third lens group.

5. A projection type display apparatus comprising a light source; a light valve; and a projection lens for projecting onto a screen an optical image formed by light modulated by said light valve; wherein said projection lens is the zoom lens according to claim 1.

* * * * *